Sept. 23, 1969      C. B. MOORE ET AL      3,468,330
DIVERTING VALVE

Filed March 27, 1967      3 Sheets-Sheet 1

INVENTORS
COLEMAN B. MOORE
ROBERT B. ADAMS

BY
ATTORNEY

Sept. 23, 1969  C. B. MOORE ET AL  3,468,330
DIVERTING VALVE

Filed March 27, 1967  3 Sheets-Sheet 2

INVENTORS
COLEMAN B. MOORE
ROBERT B. ADAMS

BY

ATTORNEY

Sept. 23, 1969     C. B. MOORE ET AL     3,468,330
DIVERTING VALVE

Filed March 27, 1967     3 Sheets-Sheet 3

INVENTORS
COLEMAN B. MOORE
ROBERT B. ADAMS
BY
ATTORNEY

United States Patent Office 3,468,330
Patented Sept. 23, 1969

3,468,330
DIVERTING VALVE
Coleman B. Moore, Uwchland, and Robert B. Adams, Tredyffrin Township, Chester County, Pa., assignors to Moore Products Co., Spring House, Pa., a corporation of Pennsylvania
Filed Mar. 27, 1967, Ser. No. 626,027
Int. Cl. F15c 1/14
U.S. Cl. 137—81.5                    1 Claim

ABSTRACT OF THE DISCLOSURE

A diverting valve is provided having no moving parts in contact with the fluid, and flow at a lower flow level passes downwardly through one passageway but upon attaining a predetermined higher flow level locks onto a wall and is delivered through another passageway, together with provisions for unlocking from the wall upon decrease of flow.

BACKGROUND OF THE INVENTION

Field of the invention

This invention relates to diverting valves for the control of liquid flow with delivery to either of two locations, dependent upon the flow, the valve having no moving parts exposed to the liquid.

This invention further relates to a diverting valve useful for but not limited to controlling flow of water into the radiator of a diesel engine locomotive when a predetermined flow rate has been etablished and to bypass the radiator at a lower predetermined flow rate to prevent freezing which might otherwise occur.

Description of the prior art

It has heretofore been proposed to provide valves with vanes or gates for selection of a path of flow but no satisfactory provisions have been made for selectivity of flow without moving parts, and with bias in a predetermined direction in the event of change of flow from a higher rate to a lower rate.

SUMMARY OF THE INVENTION

It is the principal object of the present invention to provide a diverting valve for liquids having no moving parts exposed to the liquid and with which at one flow rate the liquid is delivered through one predetermined path and at another flow rate is delivered through a different predetermined path.

It is a further object of the present invention to provide a diverting valve which is simple in construction and can have the principal component thereof made as a casting with a pair of surfaces utilizing the Coanda effect.

It is a further object of the present invention to provide a diverting valve of the character aforesaid in which the switching in both directions can be effected with a minimum of delivery into the non-selected path.

It is a further object of the present invention to provide a diverting valve for liquids with no moving parts exposed to the liquid, in which the liquid is delivered through one path for flows up to a predetermined level and for flows of greater magnitude is delivered through another path, with improved provisions for snap back to the first path when the flow decreases to a lower level.

Other objects and advantageous features of the invention will be apparent from the description and claim.

BRIEF DESCRIPTION OF THE DRAWING

The nature and characteristic features of the invention will be more readily understood from the following description taken in connection with the accompanying drawings forming part thereof, in which.

Like numerals refer to like parts throughout the several views.

DESCRIPTION OF THE PREFERRED EMBODIMENT

Figure 1:
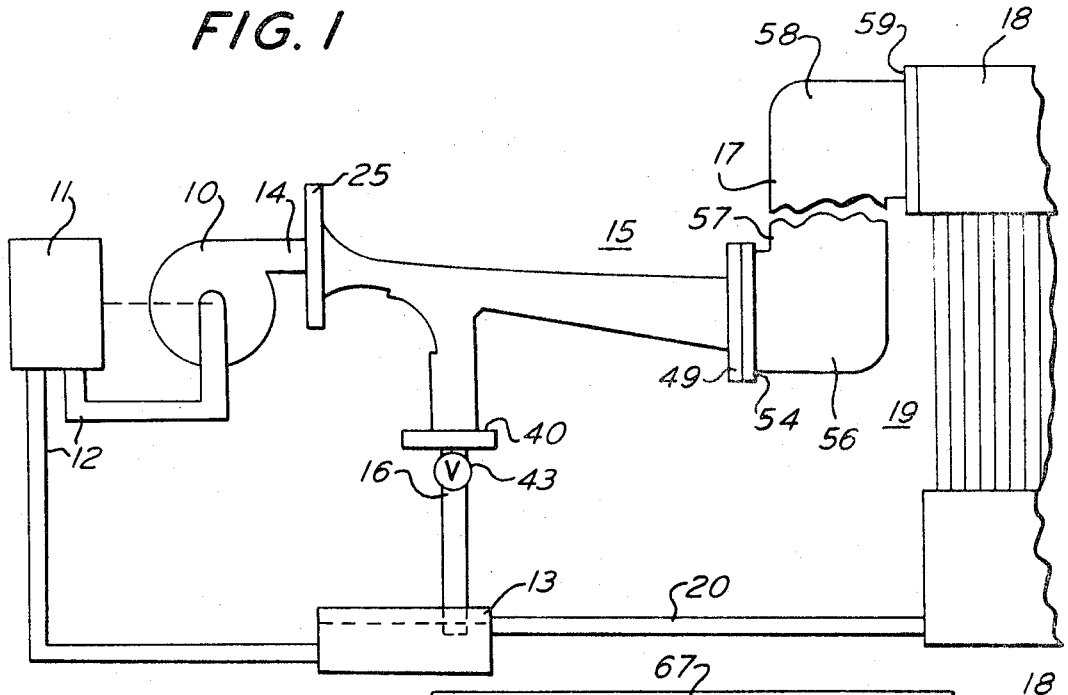
FIGURE 1 is a diagrammatic view of one fluid system embodying the diverting valve of the present invention.

Referring now more particularly to FIG. 1 of the drawings, a fluid system is illustrated having a pump 10 driven by any suitable prime mover 11 with liquid cooling, which can be a diesel engine for driving a locomotive. The pump 10 has its inlet connected by a pipe 12 from a sump 13 and in wihch the cooling system (not shown) of the prime mover 11 is connected. The pump 10 is also connected by a pipe 14 to a diverting valve 15.

The diverting valve 15 has a return connection 16 which is submerged below the level of the liquid in the sump 13. The diverting valve 15 has a delivery connection 17 extending upwardly and discharging into the upper chamber or head 18 of a cooling radiator 19, such as that employed for cooling, the fluid for the Diesel engine. The radiator 19 also has a return connection 20 to the sump 13.

The basic diverting valve 15 is shown in more detail in FIGS. 4 to 8 and includes a casting having an inlet flange 25 from which a convergent passageway 26 extends to a throat or nozzle at 27. It will be noted that the interior of the passageway 26 and nozzle 27 are rectangular in cross section, the passageway 26 and nozzle 27 having interior vertical side faces 28, and the nozzle 27 having upper and lower faces 29 and 30.

The nozzle face 29 preferably has an upper set back 31 with a sharp edge 32 and the face 30 downstream of the edge 32 has a lower set back 33 with a sharp edge 34 from which a convexly curved surface 35 extends downwardly. The surface 35 forms one boundary of one of the fluid paths, namely the discharge passageway 36. The discharge passageway 36 has opposite side boundary faces 37 aligned with the faces 28.

Extending downwardly from the curved surface 35 but with a set-back at 38, a face 39 is provided which extends to the flange 40.

The other boundary of the passageway 36 has an interior face 41 which extends upwardly to a diagonal face 42, to be explained.

For certain conditions of operation a load is desirable for the discharge passageway 36, and for the purpose a restriction 43 may be interposed in the passageway 16.

Extending from the upper nozzle face 29 a curved face 45 is provided which is set back slightly from the face 29 and which is shaped to provide a Coanda or fluid lock-on effect. The face 45 forms the upper boundary of a delivery passageway 46. The delivery passageway 46 has side boundary faces 47 and a lower boundary face 48 which extends from the diagonal face 42, and in diverging relation to the face 45. The faces 45, 47 and 48 preferably terminate at a connecting flange 49.

A fluid port 50 is provided, connected to the nozzle 27 just beyond the upper set back 31, and downstream thereof, on the face 45, a fluid port 51 is also provided. These ports 50 and 51 are not required for the fluid system of FIG. 1 and would be eliminated or blocked.

The flange 49 has connected thereto the flange 54 of the delivery connection 17 with a turn 56, an upright tubular portion 57, a turn 58 and a flange 59 for connection to the place of delivery, such as the upper chamber 18 of a radiator 19.

The mode of operation of the system of FIG. 1 will now be pointed out.

Assume liquid to be supplied through the pipe 14 at low flow below a predetermined level. The liquid passing through the convergent passageway 26 and nozzle 27 will pass downwardly along the curved surface 35 and will be delivered through the discharge passageway 36, subject to the load imposed by the restriction 43.

The jet will lock to the wall 35 by entrainment (Coanda effect) but the offset 38 at the end of this wall 35 limits the locking action to an extent that will permit rapid unlocking when switching is desired.

As the flow increases, the negative head resulting from the column of liquid in passageway 36 will no longer suffice to pass the increased flow thru the restrictive load 43 and excess liquid will begin to collect in the passageway 46, eventually blocking access of ambient gas to the region 31. When this happens, entrainment by the jet of the fluid between it and the wall 45 will rapidly reduce the pressure in this region and cause the jet to lock-on to wall 45, and be delivered thru passageway 46. From the passageway 46, through the delivery connection 17 the liquid will be delivered to the place of utilization specifically shown as the radiator 19 through which it passes and returns through the pipe 20 to the sump 13. This condition will continue so long as the rate is at the higher level.

Once the jet is locked to wall 45 it will remain so even for some reduction in flow. The surface 42 by creating a clockwise vortex of any liquid which fails to exit thru passageway 46, tends to urge the jet up thus adding to the detent of the bistable system.

If the flow decreases to a sufficient extent, the pressure recovery in the delivery passageway 46 will be insufficient to overcome the head in the delivery connection 17 and fluid will be forced into the passageway 36. But, as soon as any appreciable amount of fluid begins to flow into passageway 36 the clockwise vortex formed by surface 42 will be destroyed so that the entire stream will then become locked to the surface 35 and liquid will drain from the delivery connection 17, again exposing the surface 45 to the ambient gaseous pressure. This cycle will repeat as often as the flow fluctuates to values above the critical rate at which the jet locks onto the upper surface 45 and down to a somewhat lower rate at which it returns to lock onto the lower surface 35.

The structure just described may present difficulties in unlocking the liquid stream from the face 45 except for lower flows than desired. The system shown in FIG. 2 provides a positive unlocking at higher flow levels.

Figure 2:
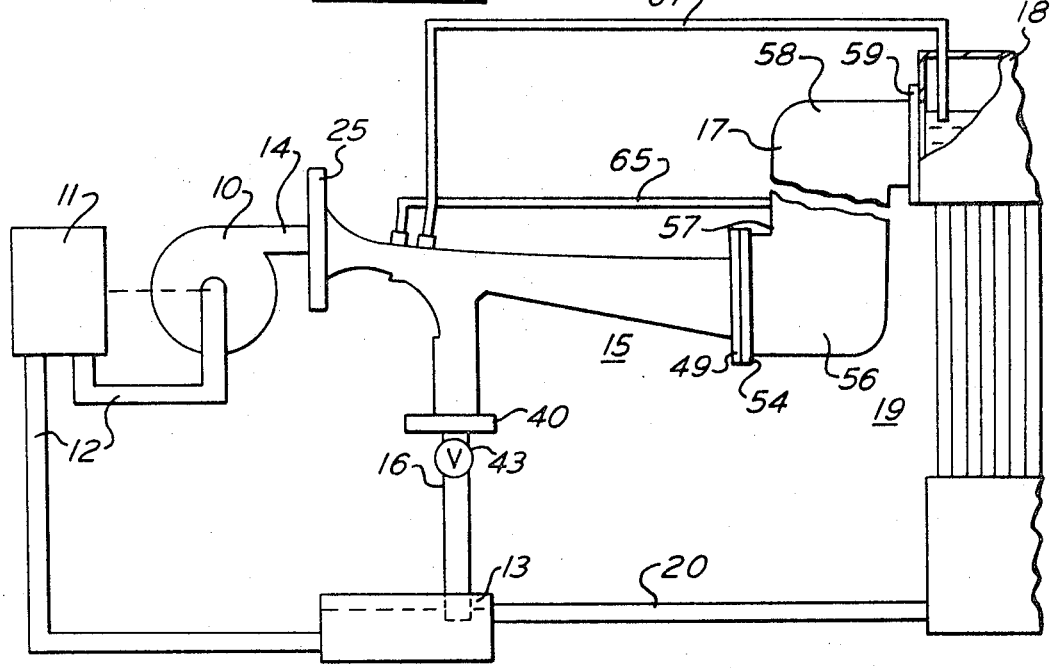
FIG. 2 is a view similar to FIG. 1 but showing a fluid system having better snap back upon decrease of flow.

Referring particularly to FIG. 2, the system is essentially the same as that of FIG. 1 except for the addition of a fluid connection 65 which is in communication with the delivery connection 17 near the lower end thereof but above the diverting valve 15 and which extends to the port 50.

A fluid connection 67 is also provided which is connected to the chamber 18 so as to be filled with liquid at maximum flow. The fluid connection 67 is connected to the port 51.

It has been found advantageous to provide, at the set back 31 a transverse groove 68 spanning the port 50 for distributing gas such as air admitted through port 50 over the entire width of wall 45 to facilitate the unlocking of the jet from wall 45 by said gas. Additional grooves 69 facilitate the passage of gas from port 51 to the transverse groove 68 and are arranged so that said passage of gas can occur only at the lower values of liquid flow in passageway 46.

Assume now that liquid is supplied through the pipe 14 at a low flow rate. The liquid passes through the nozzle 27 and gas is aspirated through the port 50 and fluid connection 65.

As the flow increases it tends to spill over into the delivery passageway 46 and causes the level to rise in the delivery connection 17 covering the connection 65 therein so that gas is no longer freely admitted to replace that entrained by the jet at port 50. This causes the liquid jet to attach to face 45. As the flow increases the radiator 19 is filled with liquid and the fluid connection 67 also becomes filled with liquid.

The port 51 is situated far enough downstream from the groove 68 so that gas entering this port cannot migrate back to the groove 68 when the liquid flow equals or exceeds the switch-up value, but close enough so that gas can reach groove 68 and unlock the jet from wall 45 at some lower flow.

The fluid connection 67 with its upper terminus in the chamber 18 also serves another function in that temporary increases and decreases in flow will not cause switching back and forth because of the time required for the level of the radiator 19 to reach the terminus of the fluid connection 67.

Figure 3:
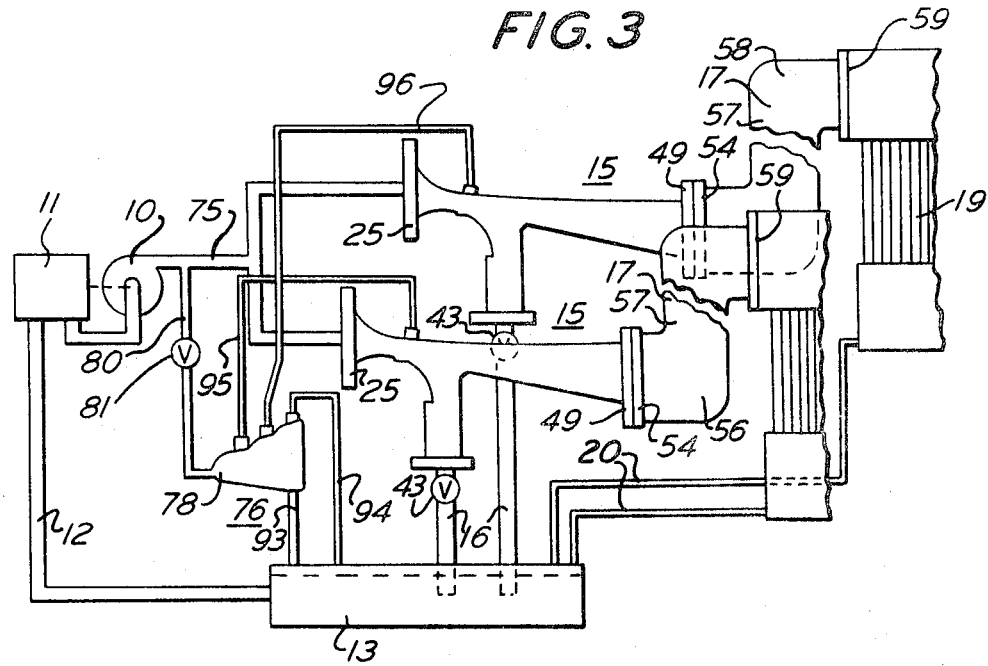
FIG. 3 is a diagrammatic view of another fluid system embodying diverting valves of the present invention in parallel arrangement.
Figure 4:
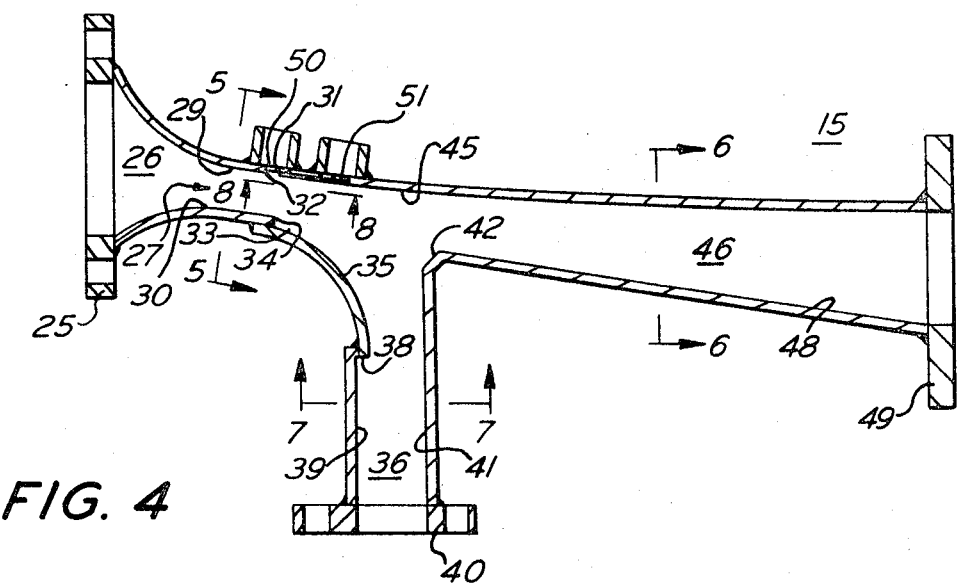
FIG. 4 is a vertical central sectional view showing a preferred embodiment of the diverting valve of the present invention.
Figure 5:
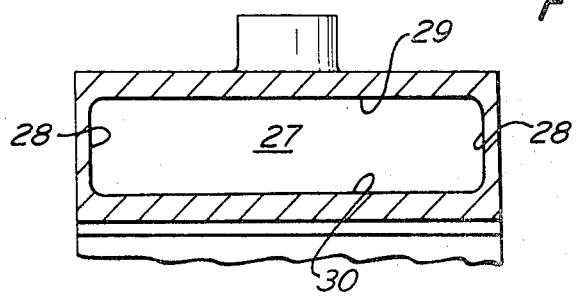
FIG. 5 is a transverse sectional view taken approximately on the line 5—5 of FIG. 4.
Figure 6:
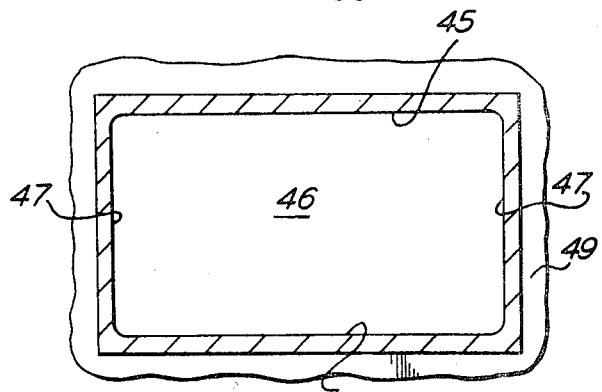
FIG. 6 is a transverse sectional view taken approximately on the line 6—6 of FIG. 4.
Figure 8:
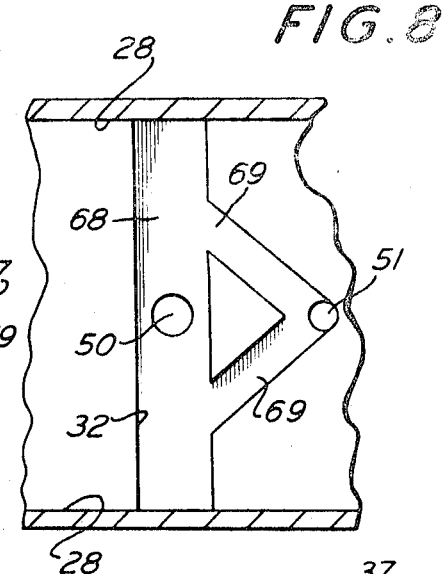
FIG. 8 is a fragmentary longitudinal sectional view, enlarged, taken on the line 8—8 of FIG. 4.
Figures 7, 9:
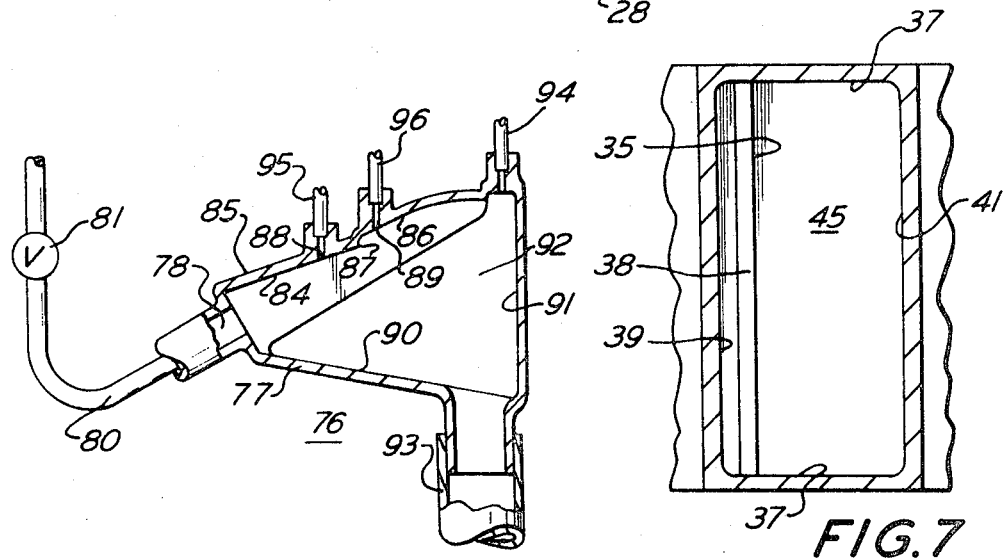
FIG. 7 is a transverse sectional view taken approximately on the line 7—7 of FIG. 4.
FIG. 9 is a vertical central sectional view of a liquid flow sensitive pilot valve which may be employed in connection with the fluid system of FIG. 3.

Referring now more particularly to FIG. 3 of the drawings, a pump 10 is provided driven by a prime mover 11, the pump 10 having an inlet connection 20 as before from the sump 13.

The outlet of the pump 10 has a fluid connection 75 with branches to a plurality of diverting valves 15. Each of the diverting valves 15 has a return connection 16 to the sump 13, with a load imposed thereon such as that of a restriction 43. The connections 16 preferably extend below the normal water level of the sump to prevent aspiration of air back through either of the connections 16.

The diverting valves 15 are connected by delivery connections 17 to any desired receivers, these being indicated as seperate radiators 19, with return connections 20 to the sump 13.

While the flow through the diverting valves could be controlled as previously pointed out in connection with the system of FIG. 1 it is preferred to employ a pilot valve 76 capable of distinguishing high and low level flow and not having any moving parts exposed to the fluid. One suitable pilot valve for this purpose is described in a copending application of D. B. Kirk, filed Apr. 18, 1967, Ser. No. 631,779, and will be briefly described herein.

The pilot valve 76 preferably has a housing 77 with an inlet nozzle 78 to which liquid is supplied from the fluid connection 75 by a fluid connection 80 through a pressure reducing restriction 81. The nozzle 78 at its upper and lower margins has sharp corners with an upwardly disposed wall portion 84, set back from the nozzle 78 at 85, and therebeyond a wall portion 86 which is set back from the wall portion 84 at 87 with a sharp corner at the end of the wall portion 84. The wall portions 84 and 86 are each shaped for a fluid lock-on, the wall portion 84 being effective for low flows and the wall portion 86 for higher flows.

The wall portion 84 has a port 88 communicating therewith and which will be covered by the liquid jet when it is locked to wall 84.

The wall portion 86 has a port 89 communicating therewith and which will be covered by the liquid jet when it is locked to wall 86.

The housing 79 has a bottom inclined drain wall 90 the upper end of which is offset below the lower sharp edge of the nozzle 78, an end wall 91, and parallel side walls 92. A lower liquid drain connection 93 extends to the sump 13. The top of the housing 77 has an air vent 94 which is connected to the sump 13.

The ports 88 and 89 are respectively connected by fluid connections 95 and 96 to the ports 50 of the diverting valves 15.

The mode of operation of the system of FIG. 3 will now be pointed out.

Assuming that liquid is supplied at low pressure level through the fluid connection 75 to both the diverting valves 15. In each of these valves 15, fluid will be delivered to the return connections 16 to the sump 13 in the manner previously explained. For this condition it is assumed that liquid flow through the fluid connection 80, restriction 81, and nozzle 78 will be at too low a level to lock onto the wall portion 84.

If now the flow rate is increased to the extent that liquid locks onto the wall portion 84, the port 88 will be closed so that air cannot flow through the fluid connection 95, to replace that entrained by the liquid jet at port 50 of its respective diverting valve 15. This causes the liquid jet in this diverting valve to lock onto its face 45 with resultant delivery through its delivery connection.

Since the connection is still open to atmosphere, for intermediate flows no change will occur in the diverting valve 15 to which the fluid connection 96 extends.

If now the flow rate is increased further so that the flow in the pilot valve 76 is sufficient to lock onto the wall portion 86, the valve 15 to which the fluid connection 96 extends will have a control signal through that fluid connection for high flow level operation.

Upon decrease of flow diverting valves 15 will change back in reverse sequence of the action upon increase of flow.

It will thus be seen that apparatus has been provided which effectively attains the objects of the invention.

We claim:

1. Liquid delivery control apparatus comprising
   a chamber,
   a nozzle member in communication with said chamber for forming a liquid jet directed into said chamber,
   fluid supply means for said nozzle member for supplying fluid at varying rates of flow,
   said chamber having an upper wall in diverging relation to the axis of said nozzle for attachment by entrainment of said liquid jet, and
   a lower wall in diverging relation to the axis of said nozzle for attachment by entrainment of said liquid jet,
   said lower wall being in more divergent relation to the axis of the nozzle than said upper wall,
   an upper delivery passageway and a lower drain passageway each having a bounding portion in alignment respectively with said upper and lower walls,
   a divider separating said passageways,
   said lower drain passageway having a cross section such that it will be filled with liquid at a flow rate above a predetermined value,
   means connected to said lower passageway for providing a pressure in said lower passageway lower than that in said upper passageway and tending to urge the liquid jet to exit through the lower passageway,
   said upper delivery passageway having a connection with an outlet elevated above said chamber providing a pressure in said upper passageway higher than that in said outlet for all values of flow therein,
   said upper wall having a control port therein in proximity to said nozzle, and
   a fluid connection between said control port and said outlet.

References Cited

UNITED STATES PATENTS

| | | | |
|---|---|---|---|
| 3,159,208 | 12/1964 | Joesting | 137—81.5 X |
| 3,187,763 | 6/1965 | Adams | 137—81.5 |
| 3,198,431 | 8/1965 | Gesell | 137—81.5 X |
| 3,225,780 | 12/1965 | Warren et al. | 137—81.5 |
| 3,244,370 | 4/1966 | Colston | 137—81.5 X |
| 3,277,914 | 10/1966 | Manion | 137—81.5 |
| 3,340,885 | 9/1967 | Bauer | 137—81.5 |
| 3,362,422 | 1/1968 | Toma | 137—81.5 |

M. CARY NELSON, Primary Examiner

WILLIAM R. CLINE, Assistant Examiner